United States Patent [19]
Vacik et al.

[11] 3,931,123
[45] Jan. 6, 1976

[54] HYDROPHILIC NITRITE COPOLYMERS

[75] Inventors: Jiri Vacik; Jindrich Kopecek, both of Praha, Czechoslovakia

[73] Assignee: Ceskoslovenska akadamie ved, Prague, Czechoslovakia

[22] Filed: Apr. 30, 1973

[21] Appl. No.: 355,496

[30] Foreign Application Priority Data

May 2, 1972  Czechoslovakia .................. 2961/72

[52] U.S. Cl. .......................... 260/80.73; 3/1; 3/15; 204/159.14; 210/31 C; 210/321; 252/430; 260/2.5 R; 260/29.6 T; 260/80.75; 260/85.5 ES; 260/859 P; 351/160
[51] Int. Cl.² ...................... C08F 8/42; C08F 16/02
[58] Field of Search ........ 260/80.75, 85.5 ES, 80.73

[56] References Cited
UNITED STATES PATENTS

| | | | |
|---|---|---|---|
| 2,484,487 | 10/1949 | Caldwell | 260/486 |
| 3,418,295 | 12/1968 | Schoenthaler | 260/80.72 |
| 3,544,262 | 12/1970 | Harris et al. | 8/115.5 |
| 3,741,272 | 6/1973 | Ullrich et al. | 159/2 E |

Primary Examiner—Stanford M. Levin

[57] ABSTRACT

A composition of matter with improved mechanical properties which contain 2 – 50 mol. percent of methacrylonitrile or acrylonitrile and 50 – 98 mol. percent of glycol monoesters of acrylic or methacrylic acid, where the glycol is selected from the group comprising ethylene glycol, diethylene glycol, triethylene glycol and their mixtures. 0.1 – 30 mol. percent of the glycol monoesters may be substituted by a crosslinking agent selected from the group comprising 1,4-cyclohexanedimethyl dimethacrylate, ethylene glycol dimethacrylate, diethylene glycol dimethacrylate, 1,6-hexamethylene-bis-acrylamide, triethylene glycol dimethacrylate, tetraethylene glycol dimethacrylate, methylene-bis-acrylamide, ethylene-bis-acrylamide. Also hydrogen catalysts of compositions bonded to platinum, palladium or rhodium metal.

A process for producing the matter, wherein glycol esters of acrylic or methacrylic acid are copolymerized with methacrylonitrile or acrylonitrile, if desired in the presence of a crosslinking agent.

3 Claims, No Drawings

HYDROPHILIC NITRITE COPOLYMERS

BACKGROUND OF THE INVENTION

The present invention relates to composition of matter comprising a hydrophilic copolymer having reactive -C ≡ N groups and process for producing thereof, which are suitable namely for medical applications, production of contact lenses, sorption materials for metals, low temperature hydrogenation catalysts, etc.

The preparation of hydrophilic polymers by a crosslinking polymerization of glycol monomethacrylates and glycol monoacrylates is known, see e.g. Czechoslovak Pat. No. 91,918. Similar, but soluble not crosslinked hydrophilic polymers are obtained according to Czechoslovak Pat. No. 124,819 by polymerization of a mixture consisting of glycol monomethacrylate and glycol monoacrylate, respectively, and solvents which have the interaction parameter with respect to the corresponding polymer lower than 0.5.

Further is known the preparation of hydrophilic polymers by copolymerization of acrylonitrile and methacrylonitrile, respectively, with hydrophilic monomers, as acrylamide, methacrylamide, acrylic acid, methacrylic acid, salts of ethylenesulphonic acid or vinylbenzenesulphonic acid. The copolymerization is carried out in this case in a medium of inorganic solvents, e.g. in a concentrated aqueous solution of $ZnCl_2$ or in concentrated nitric acid, in the limited temperature region from −50°C to +50°C.

Also known is the preparation of polymers by a partial hydrolysis of polyacrylonitrile or polymethacrylonitrile in a strongly acidic homogeneous medium, where the sequential copolymers are formed (Czechoslovak Pat. No. 148,810).

The purpose of the present invention and the basic object of the same is to overcome the aforementioned disadvantages and to significantly improve the composition of matter comprising a hydrophilic copolymer having reactive -C ≡ N groups and process for producing thereof.

SUMMARY OF THE INVENTION

In accordance with one feature of this invention we found a composition of matter with improved mechanical properties comprising a hydrophilic copolymer having reactive -C ≡ N groups, which contains 2 – 50 mol. percent of methacrylonitrile or acrylonitrile and 50 – 98 mol. percent of glycol monoesters of acrylic or methacrylic acid, where the glycol is selected from the group comprising ethylene glycol, diethylene glycol, triethylene glycol and their mixtures. 0.1 – 30 mol. percent of the monoesters may be substituted by a crosslinking agent such as 1,4-cyclohexanedimethyl dimethacrylate, ethylene glycol dimethacrylate, diethylene glycol dimethacrylate, 1,6-hexamethylene-bis-acrylamide, triethylene glycol dimethacrylate, tetraethylene glycol dimethacrylate, methylene-bis-acrylamide, ethylene-bis-acrylamide, etc.

Another feature of the invention is a process for producing the matter comprising a hydrophilic copolymer having reactive -C ≡ N groups, wherein glycol monoesters of acrylic or methacrylic acid where the glycol is selected from the group comprising ethylene glycol, diethylene glycol, triethylene glycol and their mixtures, are copolymerized either single or in a mixture with 2 to 50 mol. percent of methacrylonitrile or acrylonitrile.

The copolymerization is effected either in absence of solvents or diluting agents or in a solution of a polar solvent such as water, a lower aliphatic alcohol which contains from 1 to 5 carbon atoms, dimethyl formamide, glycol monomethylether, glycol monoethylether, etc.

The copolymerization can be carried out, if desired, in the presence of a crosslinking agent of the kind mentioned above.

The copolymerization can be carried out also in presence of precipitants of the polymer such as benzene, toluene, xylene, etc.

The copolymerization can be carried out in the presence of a chain transfer agent and the soluble polymer obtained is subsequently crosslinked.

Another feature of the invention is a low-temperature hydrogenation catalyst prepared by reaction of manufactured copolymers with rare metals selected from the group comprising Pt, Pd, Rh.

DESCRIPTION OF THE PREFERRED EMBODIMENTS

It has been found, that hydrophilic polymers possessing outstanding physical and mechanical properties can be obtained, if glycol esters of acrylic and methacrylic acids, where glycol means besides the simple ethylene glycol also diethylene glycol, triethylene glycol and further homologous polyglycols, i.e. all hydrophilic diols of this type, are copolymerized, either alone or in a mixture, with 2 – 50 mol. percent, of methacrylonitrile or acrylonitrile or their mixture without solvent or in a solution of polar solvent, as water, lower aliphatic alcohols, dimethylformamide, dimethylsulphoxide, glycol monoethylether, glycol monoethylether, etc. The most suitable content of acrylonitrile or methacrylonitrile for some purposes, as soft contact lenses, substitutes of tubular organs or heart valves, is 2 to 30 percent of the total amount of monomers in the polymerization mixture. Those polar solvents are suitable above all, which are miscible with water and can be thus perfectly extracted by water after completing the polymerization.

The aforementioned copolymers were tested from the viewpoint of their biological compatibility by subcutaneous implantation to rats, rabbits and pigs in intervals from 1 month to 1 year. The implants prepared from these copolymers were well tolerated in all animal groups and in all tested intervals. They do not develop any significant reaction. The implants were encapsulated with a fine fibrous capsule, which adheres to the implant surface and grows through its inside.

An advantage of these copolymers are their good mechanical properties. For example, the polymer containing 20 percent of methacrylonitrile has the elasticity modulus and elongation at break on 50 percent better than poly(glycol methacrylate). This unexpected effect is due to interactions of -C ≡ N groups of neighbour polymeric chains. Reproducibility in the preparation of these copolymers and the absence of -COOH groups causing the change of polymer properties with changing pH of the surrounding medium are further advantages in comparison with gels prepared by the hydrolysis of polyacrylonitrile and polymethacrylonitrile.

Incorporation of the reactive -C ≡ N groups in the direct copolymerization of glycol acrylates and glycol methacrylates, respectively, with methacrylonitrile or acrylonitrile enables usage of the polymers prepared according to the invention as sorption materials for rare metals, as Rh, Pd, Pt, Os, Ir, etc., namely for sorption of these metals from solutions of their salts.

A broad selection of homogeneous or heterogeneous hydrogenation catalysts for both polar and nonpolar mediums can be prepared on a bases of these copolymers containing Pt, Pd or Rh. The metals are fixed on the polymeric skeleton through -C ≡ N groups by the coordination bond. A great advantage of these polymers used as the low-temperature hydrogenation catalysts is an easy recovery of metals from the polar polymeric carriers.

The aforesaid hydrogels can be obtained either in a homogeneous transparent state or like an opaque sponge or macroporous gel, similarly as the gels made of only ethylene glycol monomethacrylate crosslinked by a suitable crosslinking agent, e.g. by glycol diesters of acrylic or methacrylic acid, or they can be obtained as soluble polymers. Their properties depend mostly on that, if the crosslinking agent was used in copolymerization, on the amount of the crosslinking agent, and on the quality of the solvent and concentration of monomers in it. When the crosslinking agent can manifest itself per se, the properties change according to a network density in the known manner. Thus, for instance, the effective concentration about 0.1 to 2 percent is suitable for soft elastic gels and 5 – 30 percent for macroporous gels. The following examples of crosslinking agents soluble in the monomer mixture can be given: ethylene glycol dimethacrylate, diethylene glycol dimethacrylate, 1,4-cyclohexanedimethyl dimethacrylate, 1,6-hexamethylenebisacrylamide, 1,6-hexamethylene dimethacrylate, neopentyl glycol dimethacrylate, Bisfenol A dimethacrylate, tetramethylene diacrylate, 1,1,1-trimethyloletan triacrylate, 1,1,1-trimethylolpropan trimethacrylate, diisopropylene glycol dimethacrylate, ethylidene diacrylate, ethylidene dimethacrylate, divinylsulphone, triacryloylperhydrotriazine. The chosen crosslinking agents have to be completely soluble in the given monomeric mixture. A tensile strength, elongation at break and stability at the long-term stress increase with raising content of acrylonitrile and methacrylonitrile, respectively. This fact found is surprising in a great deal, as it is known that copolymers containing less than about 85 percent of acrylonitrile lose their strength considerably, unless they have explicitly a block (sequential) structure. The analogous assumptions pay to a certain degree for copolymers with methacrylonitrile.

The copolymerization can be carried out also in the presence of polymer precipitants, as for instance toluene, xylene and benzene, or in their mixtures with polar solvents. It can be also carried out in the presence of a chain transfer agent and the soluble polymer thus obtained can be additionally crosslinked. Carbon tetrabromide, carbon tetrachloride, dodecylmercaptan, or other compounds can be advantageously used as chain transfer agents.

Besides the applications mentioned above, the polymers according to the invention can be used for various technical purposes, as for sorption materials, materials for the gel chromatography for preparation of dialysis membranes, etc.

The preparation of copolymers according to the invention is described in the following examples of performance, which illustrates only typical compositions and preparation conditions, without limiting the scope of the invention.

EXAMPLE 1

Water (20 wt. percent) was mixed with 80 wt. percent a mixture consisting of 10 wt. percent of methacrylonitrile, 89.8 wt. percent of 2-hydroxyethyl methacrylate and 0.2 wt. percent of ethylene dimethacrylate. This mixture was polymerized with 0.1 wt. percent of methyl azobisisobutyrate (calculated on the total amount of monomers) for 6 hours at 60°C. The material is suitable for preparation of contact lenses by the mechanical process according to Czechoslovak Pat. No. 132,141.

EXAMPLE 2

A mixture consisting of 69.9 wt. percent of 2-hydroxyethyl metacrylate, 30 wt. percent of methacrylonitrile and 0.1 wt. percent of ethylene dimethacrylate was mixed in amount of 70 wt. percent with 30 wt. percent of ethylene glycol and 0.1 wt. percent of tert-butyl peroxooctoate (calculated on the total amount of monomers) and polymerized for 8 hours at 60°C. The material produced is suitable for preparation of membranes for a separation of rare metals from solutions of their salts.

EXAMPLE 3

Water (20 wt. percent) was mixed with 80 wt. percent of a mixture consisting of 15 wt. percent of methacrylonitrile, 84.6 wt. percent of ethylene glycol monomethacrylate and 0.4 wt. percent of ethylenne dimethacrylate, and polymerized with 0.1 wt. percent of a mixture of ammonium persulphate and dimethylaminoethyl acetate (1 : 1) calculated on the total amount of monomers. The polymerization proceeded at the ambient temperature. This low-temperature polymerization is suitable for preparation of contact lenses by the mechanical process (Czechoslovak Pat. No. 132,141) or for preparation of tubular organs or heart valves.

EXAMPLE 4

A mixture of 69.9 wt. percent of diglycol monomethacrylate, 30 wt. percent of methacrylonitrile and 0.4 wt. percent of diglycol dimethacrylate was polymerized with 0.05 wt. percent of diisopropyl peroxocarbonate (on the total amount of monomers). The mixture was polymerized in a bulk at 40°C.

EXAMPLE 5

Dimethylfomamide (30 wt. percent) was mixed with 70 wt. percent of a mixture consisting of 50 wt. percent of methacrylonitrile, 49.6 wt. percent of 2-hydroxyethyl methacrylate and 0.4 wt. percent ethylene dimethacrylate. Then, 0.1 wt. percent of 2,2'-azobis-2,4-dimethyl-4-methoxyvaleronitrile (on the total weight of monomers) was added and the polymerization was carried out at 50°C for 7 hours.

A high concentration of ≡ CN groups enables to prepare membranes from these copolymers, which have a specific separation effect, while a low content of 2-hydroxyethyl methacrylate still secures their limited swelling and permeability for water.

EXAMPLE 6

A mixture consisting of 50 wt. percent of methacrylonitrile, 49.2 wt. percent of triethylene glycol monomethacrylate and 0.8 wt. percent of triethylene glycol dimethacrylate was mixed in amount of 80 wt. percent with 20 wt. percent of dimethylformamide and then polymerized with 0.1 wt. percent of azobisisobutyronitrile (on the total amount of monomers) at 60°C for 6 hours.

EXAMPLE 7

Dimethylsulphoxide (30 wt. percent) was mixed with 70 wt. percent of a mixture consisting of 85 wt. percent of triethylene glycol monomethacrylate, 10 wt. percent of methacrylonitrile and 5 wt. percent of triethylene glycol dimethacrylate. The mixture was polymerized in the presence of 0.1 wt. percent of benzoyl peroxide (on the total amount of monomers) at 60°C.

EXAMPLE 8

2-Hydroxyethyl acrylate (80 wt. percent) was mixed with 19.9 wt. percent of methacrylonitrile and 0.1 wt. percent of ethylene diacrylate and polymerized in a bulk in the presence of 0.05 wt. percent of tert-butyl peroxoacetate (on the total amount of monomers) at 60°C in the course of 5 hours.

EXAMPLE 9

A mixture consisting of 69.7 wt. percent of diethylene glycol monoacrylate, 30 wt. percent of methacrylonitrile and 0.3 wt. percent diethylene glycol diacrylate was mixed in the amount of 80 wt. percent with 20 wt. percent of dimethylformamide and polymerized with 0.1 wt. percent of tert-butyl hydroperoxide (on the total amount of monomers) at 60°C for 6 hours.

EXAMPLE 10

A mixture consisting of 89.8 wt. percent of 2-hydroxyethyl methacrylate, 10 wt. percent of methacrylonitrile and 0.2 wt. percent of ethylene dimethacrylate was polymerized in the amount of 80 wt. percent with 20 wt. percent of dimethyl cellosolve at 60°C for 7 hours in the presence of 0.08 wt. percent of diisopropyl peroxocarbonate (on the total amount of monomers).

EXAMPLE 11

Dimethylsulphoxide (20 wt. percent) was mixed with 80 wt. percent of a mixture consisting of 30 wt. percent of methacrylonitrile, 69.2 wt. percent of 2-hydroxyethyl methacrylate and 0.8 wt. percent of divinylbenzene and then polymerized with 0.1 wt. percent of cumene hydroperoxide (on the total amount of monomers) at 60°C for 7 hours.

EXAMPLE 12

2-Hydroxyethyl methacrylate (89.7 wt. percent) and 10 wt. percent of acrylonitrile was polymerized in a bulk in the presence of 0.3 wt. percent of ethylene dimethacrylate using 0.05 wt. percent of diisopropyl peroxocarbonate, first for 4 hours at 40°C and then for 3 hours at 60°C. The polymer block was used for preparation of contact lenses by a mechanical working.

EXAMPLE 13

Dimethylformamide (30 wt. percent) was mixed with 70 wt. percent of a mixture consisting of 30 wt. percent of acrylonitrile, 69.5 wt. percent of triethylene glycol monomethacrylate and 0.5 wt. percent of triethylene glycol dimethacrylate and polymerized by means of 0.1 wt. percent of diisopropyl peroxocarbonate (on the total amount of monomers) forming the gel.

EXAMPLE 14

Water (20 wt. percent) and 80 wt. percent of a mixture consisting of 94.9 wt. percent of triethylene glycol monomethacrylate, 5 wt. percent of methacrylonitrile and 0.1 wt. percent of triethylene glycol dimethacrylate was polymerized for 7 hours at 60°C with 0.1 wt. percent of tert-butyl peroxooctoate (on the total amount of monomers) at 60°C. After the polymerization was completed the polymer was conditioned into water.

EXAMPLE 15 n-Butanol (20 wt. percent) was mixed with 80 wt. percent of a mixture consisting of 87 wt. percent of 2-hydroxyethyl methacrylate, 10 wt. percent of methacrylonitrile and 3 wt. percent of ethylene dimethacrylate and polymerized with 0.05 wt. percent of methyl azobisisobutyrate (on the total weight of monomers) for 16 hours by uv irradiation at the ambient temperature.

EXAMPLE 16

A mixture of 89.8 wt. percent of 2-hydroxyethyl methacrylate, 10 wt. percent of methacrylonitrile and 0.2 wt. percent of ethylene dimethacrylate was polymerized in a bulk in the presence of 0.05 wt. percent of diisopropyl peroxocarbonate (on the total amount of monomers) at 50°C for 8 hours.

The Examples 1 to 16, if performed with other type of the solvent than with water, require a subsequent conditioning into aqueous medium for medical applications. The conditioning is carried out in this cases by five to tenfold overlaying of the polymer obtained with ethanol; time period between single exchanges is 24 hours. Then follows a five to tenfold conditioning by water with the period between single exchanges 24 hours again. Eventually, the five to tenfold conditioning is carried out by a physiologic saline with the same time periods of exchange. A volume ratio of the solvent (ethanol, water and physiologic saline) to the conditioned polymer should be minimally 30 : 1. Shortly before application, the polymer is sterilized for 30 min. at 120°C in an autoclave or by irradiation.

EXAMPLE 17

Dimethylformamide (70 wt. percent) and 30 wt. percent of a mixture consisting of 70 wt. percent of 2-hydroxyethyl methacrylate and 30 wt. percent of methacrylonitrile were polymerized in an inert atmosphere using 0.4 wt. percent of benzoyl peroxide (on the total amount of monomers) at 60°C for 10 hours. The soluble polymer was obtained, which may be directly used for preparation of highly elastic foils by casting and evaporation of a solvent from the film. The film can be prepared also in an insoluble form by additional crosslinking, for instance as follows: Into 100 wt. percent of the solution having the above given composition, 0.8 – 1 wt. percent (on the weight of the polymer) of $(NH_4)_2Cr_2O_7$ is added as a 20 percent aqueous solution. The crosslinked film is obtained after 16 hours at the ambient temperature. The procedure is suitable to prepare coats for plasters or photosensitive layers.

EXAMPLE 18

Dimethylsulphoxide (80 wt. percent) and 20 wt. percent of a mixture consisting of 40 wt. percent of methacrylonitrile, 59 wt. percent of 2-hydroxyethyl methacrylate and 1 wt. percent of ethylene dimethacrylate was polymerized with 0.5 wt. percent of tert-butyl peroxooctoate on the total amount of monomers at 70°C for 10 hours to the maximal conversion. The soluble polymer was obtained which may be used either directly or being reprecipitated from ether and water, respectively. This polymer was dried and dissolved again in CH₃OH, CH₃CH₂OH, methyl or ethyl cellosolve and used for preparation of foils, membranes, etc.

EXAMPLE 19

A mixture consisting of 90 wt. percent of 2-hydroxyethyl methacrylate (containing up to 2 percent ethylene dimethacrylate) and 10 wt. percent acrylonitrile was mixed in amount of 15 wt. percent with 85 wt. percent of dimethylformamide and polymerized at 70°C for 10 hours using 1.0 wt. percent of azobisisobutyronitrile on the total weight of monomers. The polymeric solution formed was mixed with 0.8 wt. percent of diisocyanates (on the weight of comonomers), casted on a glass or another plate, evaporated and heated to 135°C. A crosslinked membrane was obtained during 30 minutes with excelent mechanical properties.

EXAMPLE 20

Dimethylformamide (70 wt. percent) was mixed with 30 wt. percent of a mixture consisting of 50 wt. percent of methacrylonitrile, 50 wt. percent of diethylene glycol monomethacrylate (content of the divinyl component up to 1 percent) and polymerized with 1 wt. percent of methyl azobisisobutyrate (on the total amount of monomers) at 70°C for 10 hours.

EXAMPLE 21

Dimethylformamide (60 wt. percent) was mixed with 40 wt. percent of a mixture consisting of 50 wt. percent of triethylene glycol monomethacrylate and 50 wt. percent of methacrylonitrile and polymerized with 2 wt. percent of azobisisobutyronitrile at 80°C for 10 hours, giving rise to a soluble polymer.

EXAMPLE 22

Dimethylformamide (80 wt. percent) was mixed with 20 wt. percent of a mixture consisting of 10 wt. percent of acrylonitrile and 90 wt. percent of diethylene glycol monoacrylate and polymerized at 60°C with 0.5 wt. percent of cumene hydroperoxide (on the total weight of monomers) for 10 hours giving rise to a soluble polymer.

EXAMPLE 23

Dimethylsulphoxide (85 wt. percent) was mixed with 15 wt. percent of a mixture consisting of 15 wt. percent of methacrylonitrile and 85 wt. percent of 2-hydroxyethyl methacrylate and polymerized with 0.4 wt. percent of 2,2'-azobis-2,4-dimethyl-4-methoxyvaleronitrile (on the total amount of monomer) at 50°C. After 10 hours heating in an inert atmosphere a soluble polymer was obtained.

EXAMPLE 24

A mixture consisting of 40 wt. percent of methacrylonitrile and 60 wt. percent of 2-hydroxyethyl methacrylate was mixed in the amount of 20 wt. percent with 80 wt. percent of dimethylformamide and polymerized in the presence of 0.4 wt. percent of tert-butyl peroxooctoate (on the total amount of monomers) at 70°C, giving after 10 hours a soluble polymer. An insoluble polymer can be prepared from the obtained soluble one by addition of diisocyanate in a free form (e.g. as 2,4-toluenediisocyanate, hexamethylenediisocyanate, etc.) or in a blocked form, e.g.

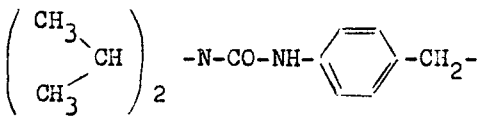

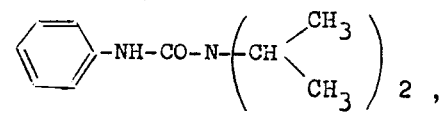

$(C_2H_5)_2$-NCONH-$(CH_2)_6$-NHCON-$(-C_2H_5)_2$, and the like, and the subsequent evaporation of the solvent and heating to the temperature 120° – 170°C (according to the character of diisocyanate used; for the unblocked type of diisocyanate suffices the lower temperature, for the blocked type the high temperature is necessary). For example, membranes, fibers, and the like, can be prepared by the additional crosslinking.

EXAMPLE 25

Methyl cellosolve (80 wt. percent) was mixed with 20 wt. percent of a mixture consisting of 15 wt. percent of methacrylonitrile and 85 wt. percent of 2-hydroxyethyl methacrylate and the resulting mixture was polymerized at 80°C with 0.6 wt. percent of azobisisobutyronitrile (on the total weight of monomers) for 10 hours in an inert atmosphere. The soluble polymer was obtained, which may be used in preparation of coats for poly(vinyl chloride), using evaporation of its solution followed by crosslinking with $(NH_4)_2Cr_2O_7$ under irradiation with a UV lamp for 30 minutes.

The polymer can be also applied in a preparation of lacquers for glass using the additional crosslinking by diisocyanates (0.5 wt. percent on the polymer) or melamine resins (at concentrations up to 2.5 wt. percent on 2-hydroxyethyl methacrylate in the polymer).

EXAMPLE 26

Methanol (80 wt. percent) was mixed with 20 wt. percent of a mixture consisting of 5 wt. percent of methacrylonitrile and 95 wt. percent of 2-hydroxyethyl methacrylate and 1 wt. percent of tert-butyl peroxoacetate (on the total amount of monomers) was added. The mixture was polymerized at 60°C for 10 hours. The resulting soluble polymer can be used, after several reprecipitations, in preparation of coats for catheters and surgical sewing materials.

The concentration of the corresponding diester has to be taken into account in Example 17 to 26, which can range to the upper limit 0.01 – 50 percent, advantageously up to 2 percent of the monoester. At higher contents of diester, the concentration of the monomer mixture has to be decreased or a chain transfer agent can be added in the amount up to 5 percent on the weight of monomers, as e.g. dodecylmercaptane, $CBr_4$, $CCl_{14}$, etc. The amount of the chain transfer agent is choosen according to the content of the divinyl component and the total concentration of the monomer mixture.

EXAMPLE 27

Water (60 wt. percent) and 40 wt. percent of a mixture consisting of 10 wt. percent of methacrylonitrile, 89.2 wt. percent of 2-hydroxyethyl methacrylate and 0.8 wt. percent of ethylene dimethacrylate was polymerized with 1 wt. percent of ammonium persulphate calculated on the total weight of monomers (added as a 10 percent aqueous solution) at 60°C. A microporous spongy polymer was obtained after 4 hours. The high mechanical strength of these spongeous polymers together with their porosity predetermines the polymers to numerous applications, as e.g. for dressings for burns, for encapsulation of drugs into these materials, and the like.

EXAMPLE 28

Water (80 wt. percent) and 20 wt. percent of a mixture consisting of 78 wt. percent of 2-hydroxyethyl methacrylate, 20 wt. percent of methacrylonitrile and 2 wt. percent of ethylene dimethacrylate was polymerized with 3 wt. percent of a 30 percent aqueous solution of $H_2O_2$ (on the total weight of monomers) at 70°C. The macroporous spongeous polymer was obtained after 6 hours, which is suitable for preparation of block packings of separation columns.

EXAMPLE 29

Water (90 wt. percent) was mixed with 10 wt. percent of a mixture consisting of 89 wt. percent of diethylene glycol monomethacrylate, 1 wt. percent of diethylene glycol dimethacrylate and 10 wt. percent of methacrylonitrile. The mixture was polymerized with 1 wt. percent of ammonium persulphate (on the total amount of monomers) at 70°C. The microporous spongeous polymer was obtained after 6 hours.

EXAMPLE 30

Water (60 wt. percent) was mixed with 40 wt. percent of a mixture consisting of 5 wt. percent of acrylonitrile, 90 wt. percent of 2-hydroxyethyl methacrylate and 5 wt. percent of ethylene dimethacrylate was polymerized with 1 wt. percent of ammonium persulphate (added as a 10 percent aqueous solution, calculated on the total amount of monomers) at 60°C. The microporous spongeous polymer was obtained after 5 hours.

EXAMPLE 31

Toluene (70 wt. percent) was mixed with 30 wt. percent of a mixture consisting of 30 wt. percent of methacrylonitrile, 50 wt. percent of 2-hydroxyethyl methacrylate and 20 wt. percent of ethylene dimethacrylate and polymerized with 1 wt. percent of benzoyl peroxide (on the total weight of monomers) at 50°C for 2 hours and then at 80°C for other 6 hours in an inert atmosphere. Macroporous, highly crosslinked particles were obtained having a size 4 – 20 $\mu$. The polymer obtained was added into a 1 percent dimethylformamide solution of palladium chloride and the mixture was thoroughly stirred and heated to 50°C for 1 hour. The polymer was then filtered off, washed with benzene and dried. The polymer thus obtained may be used as a low-temperature hydrogenation catalyst.

EXAMPLE 32

A mixture consisting of 50 wt. percent of methacrylonitrile, 30 wt. percent of 2-hydroxyethyl methacrylate and 20 wt. percent of ethylene dimethacrylate was polymerized in amount of 70 wt. percent with 30 wt. percent of toluene in the presence of 0.1 wt. percent of tert-butyl peroxooctoate (on the total amount of monomers) at 60°C. The compact macroporous material was obtained with a high content of nitrile groups.

EXAMPLE 33

A mixture consisting of 50 wt. percent of methacrylonitrile, 40 wt. percent of 2-hydroxyethyl methacrylate and 10 wt. percent of ethylene dimethacrylate was mixed in the amount of 75 wt. percent with 25 wt. percent of toluene. The mixture was polymerized with 0.2 wt. percent of azobisisobutyronitrile (on the total amount of monomers) in an inert atmosphere for 10 hours at 60°C. The compact macroporous polymer was obtained.

EXAMPLE 34

Toluene (75 wt. percent) was mixed with 25 wt. percent of a mixture consisting of 50 wt. percent of methacrylonitrile, 20 wt. percent of ethylene dimethacrylate and 30 wt percent of 2-hydroxyethyl methacrylate. The above mixture was polymerized after addition of 1 wt. percent benzoyl peroxide (on the total amount of monomers) for 10 hours at 50°C with an intense agitation. The polymer was added into a 5 percent benzene solution of benzonitrile complex compound with palladium chloride and the mixture was vigorously agitated and heated to 60°C for 1 hour. The polymer was then filtered off and several times washed with benzene on a sintered glass filter. It can be used as a hydrogenation catalyst.

EXAMPLE 35

A cylindric reactor was charged with 80 wt. percent of a mixture consisting of 100 wt. parts of water, 36 wt. parts NaCl and 1.4 – 1.6 wt. parts of $Mg(OH)_2$, which was prepared directly in the reaction mixture by precipitation of $MgSO_4.7\ H_2O$. Sodium hydroxide was added into the intensively agitated aqueous solution of NaCl and $MgSO_4.7\ H_2O$ during 20 minutes. A mixture (20 wt. percent) consisting of 20 wt. percent of methacrylonitrile, 40 wt. percent of 2-hydroxyethyl methacrylate, 10 wt. percent of ehtylene dimethacrylate and 30 wt. percent of toluene was then added into this suspension of $Mg(OH)_2$ in NaCl solution continuously agitated. The suspension was vigorously agitated and polymerized with 1 wt. percent of benzoyl peroxide (on the total amount of monomers) by heating to 25°C for 10 minutes and then for 3 hours to 60°C. The polymerization was then stopped; magnesium hydroxide was dissolved in the equivalent amount of HCl and the suspension copolymer was filtered off, washed with water, methanol and ether, and dried.

The aforegiven types of copolymers can be prepared by methods described in Czechoslovak Pat. No. 131,449.

Given examples for preparations of macroporous polymers (Examples 31 to 35) do not include all possibilities of preparation. Macroporous polymers possessing a regular geometrical shape can be obtained by the choice of suitable reaction condition in such a way that the surface area and the volume of a particle are in an advantageous ratio. Accordingly, the polymers prepared in this way can be used for sorption of heavy metals, as e.g. platinum, palladium or rhodium, from solutions of their salts, and low-temperature hydrogenation catalysts can be thus prepared having a high concentration of these metals on the particle surface. Another advantate is, that the rare metals can be readily recovered.

To prepare the complexes of Pt, Rh, and Pd with the polymer, it is advantageous to start with complex salts of Pt, Rh or Pd in the form of dimethylformamide solutions or with benzonitrile, carbonyl or chlorocarbonyl complexes of these metals in nonpolar solvents (benzene, toluene, and so like). These complexes may be also used for separation of olefin mixtures.

We claim:

1. A composition comprising a hydrophilic copolymer having reactive —C≡N groups, which contains (A) 2 – 50 mol. percent of methacrylonitrile or acrylonitrile and (B) 50 – 98 mol. percent of glycol monoesters of acrylic or methacrylic acid, where the glycol is selected from the group consisting of ethylene glycol, diethylene glycol, triethylene glycol and their mixtures.

2. A composition comprising a hydrophilic copolymer having reactive —C≡N groups, which contains (A) 2 – 50 mol. percent of methacrylonitrile or acrylonitrile, (B) 97.9 – 20 percent glycol monoesters of acrylic or methacrylic acid, wherein the glycol is selected from the group consisting of ethylene glycol, diethylene glycol, triethylene glycol and their mixtures, and (C) 0.1 – 30 mol. percent of a cross-linking agent selected from the group consisting of 1,4-cyclohexane dimethyl dimethacrylate, ethylene glycol dimethacrylate, diethylene glycol dimethacrylate, 1,6-hexamethylene-bis-acrylamide, triethylene glycol dimethacrylate, tetraethylene glycol dimethacrylate, methylene-bis-acrylamide, and ethylene-bis-acrylamide.

3. A low-temperature hydrogenation catalyst comprising the composition of claim 2 having bonded thereto a metal selected from the group consisting of Pt, Pd, and Rh.

* * * * *